United States Patent
Tachihara et al.

[11] Patent Number: 5,530,591
[45] Date of Patent: Jun. 25, 1996

[54] OBJECTIVE LENS FOR ENDOSCOPE

[75] Inventors: Satoru Tachihara; Kazuyuki Takahashi, both of Tokyo, Japan

[73] Assignee: Asahi Kogaku Kogyo Kabushiki Kaisha, Tokyo, Japan

[21] Appl. No.: 331,970

[22] Filed: Oct. 31, 1994

[30] Foreign Application Priority Data

Nov. 1, 1993 [JP] Japan ................... 5-273902
Sep. 6, 1994 [JP] Japan ................... 6-212850

[51] Int. Cl.$^6$ ............... G02B 21/02; G02B 3/08; G02B 9/12
[52] U.S. Cl. .............. 359/661; 359/740; 359/784; 359/788
[58] Field of Search ....................... 359/740, 784, 359/788, 790, 661

[56] References Cited

U.S. PATENT DOCUMENTS

| | | | |
|---|---|---|---|
| 4,037,938 | 7/1977 | Yamashita et al. | 359/734 |
| 4,042,295 | 8/1977 | Yamasita et al. | 359/735 |
| 4,059,344 | 11/1977 | Yamasita | 359/783 |
| 4,403,837 | 9/1983 | Nakahashi | 359/770 |
| 4,493,537 | 1/1985 | Nakahashi | 359/783 |
| 4,674,844 | 6/1987 | Nishioka et al. | 359/782 |
| 4,764,001 | 8/1988 | Yokota | 359/740 |
| 4,806,001 | 2/1989 | Okabe et al. | 359/708 |
| 4,867,546 | 9/1989 | Nishioka et al. | 359/714 |
| 4,979,808 | 12/1990 | Yamagata et al. | 359/740 |
| 5,050,974 | 9/1991 | Takasugi et al. | 359/728 |
| 5,087,989 | 2/1992 | Igarashi | 359/692 |
| 5,119,238 | 6/1992 | Igarashi | 359/740 |
| 5,175,650 | 12/1992 | Takayama et al. | 359/716 |
| 5,198,931 | 3/1993 | Igarashi | 359/660 |
| 5,208,702 | 5/1993 | Shiraiwa | 359/663 |
| 5,223,982 | 6/1993 | Suzuki et al. | 359/716 |
| 5,296,971 | 3/1994 | Mori | 359/716 |
| 5,418,649 | 5/1995 | Igarashi | 359/740 |

FOREIGN PATENT DOCUMENTS 63-293515  11/1988  Japan.

Primary Examiner—Georgia Y. Epps
Assistant Examiner—Evelyn A. Lester
Attorney, Agent, or Firm—Greenblum & Bernstein

[57] ABSTRACT

An objective lens for an endoscope includes a first lens group having one negative lens, a second positive lens group having at least one positive lens, and a third positive lens group having a cemented lens consisting of one positive lens and a negative lens adhered thereto. The objective lens satisfies the requirements defined by the following relationships:

$$\theta_{g,d} < -2.223 \times 10^{-3} \cdot v_d + 1.365; \text{ and,}$$

$$-1.2 < f_1/f < -0.8,$$

wherein $\theta_{g,d} = (n_g - n_d)/(n_F - n_C)$, $n_g$ represents the refractive index of the glass material of the first lens at the g-line, $n_d$ represents the refractive index of the glass material of the first lens at the d-line, $n_F$ represents the refractive index of the glass material of the first lens at the F-line, $n_C$ represents the refractive index of the glass material of the first lens at the C-line, $v_d$ represents the Abbe number of the glass material of the first lens, $f_1$ represents the focal length of the first lens, and f represents the focal length of the whole lens system.

3 Claims, 11 Drawing Sheets

1

OBJECTIVE LENS FOR ENDOSCOPE

BACKGROUND OF THE INVENTION

1. Field of the Invention

The present invention relates to an objective lens for a medical or industrial endoscope.

2. Description of Related Art

In an objective lens for an endoscope, attempts have been made to eliminate chromatic aberration and particularly, transverse chromatic aberration, which deteriorates an image quality.

For example, the assignee of the present application has proposed a lens arrangement to reduce the transverse chromatic aberration in Japanese Unexamined Patent Publication No. 63-293515. In this proposal, the improvement was directed at the requirements for the Abbe number of a glass material to be used, but there was no specific reference to a relative partial dispersion of the glass material.

SUMMARY OF THE INVENTION

The primary object of the present invention is to provide an objective lens for an endoscope in which the chromatic aberration and particularly, the transverse chromatic aberration, can be eliminated or reduced taking into account the relative partial dispersion of a glass material of which the lens is made.

To achieve the object mentioned above, according to an aspect of the present invention, there is provided an objective lens for an endoscope comprising a first lens group comprised of one negative lens, a second positive lens group comprised of at least one positive lens, and a third positive lens group comprised of one positive lens or a cemented lens including one positive lens and a negative lens adhered thereto, arranged in this order from an object side. The objective lens satisfies the following relationships:

$$\theta_{g,d} < -2.223 \times 10^{-3} \cdot v_d + 1.365 \quad (1)$$

$$-1.2 < f_1/f < -0.8 \quad (2)$$

wherein $\theta_{g,d} = (n_g - n_d)/(n_F - n_c)$ $n_g$: refractive index of the glass material of the first lens at the g-line;

$n_d$: refractive index of the glass material of the first lens at the d-line;

$n_F$: refractive index of the glass material of the first lens at the F-line;

$n_c$: refractive index of the glass material of the first lens at the C-line;

$v_d$: Abbe number of the glass material of the first lens;

$f_1$: focal length of the first lens; and $f$: focal length of the whole lens system, Preferably, the objective lens satisfies the following relationships:

$$v_d < 55 \quad (3)$$

$$n_{n3} - n_{p3} > 0.12 \quad (4)$$

wherein $n_{p3}$: refractive index of the negative lens in the third lens group at the d-line; and $n_{ps}$: refractive index of the positive lens in the third lens group at the d-line Moreover, the objective lens further satisfies the following relationships:

$$-1.2 < R_A/f < -0.6 \quad (5)$$

$$0.05 < d_2/f < 0.3 \quad (6)$$

wherein $R_A$: radius of curvature of the surface of the second lens group that is located closest to an object image; and $d_2$: distance between the first lens group and the second lens group.

The present disclosure relates to subject matter contained in Japanese patent application No. 5-273902 (filed on Nov. 1, 1993) and Japanese patent application No. 6-212850 (filed on Sep. 6, 1994) which are expressly incorporated herein by reference in their entirety.

BRIEF DESCRIPTION OF THE DRAWINGS

The present invention will be described below in detail with reference to the accompanying drawings, in which.

DESCRIPTION OF THE PREFERRED EMBODIMENT

Figure 1:
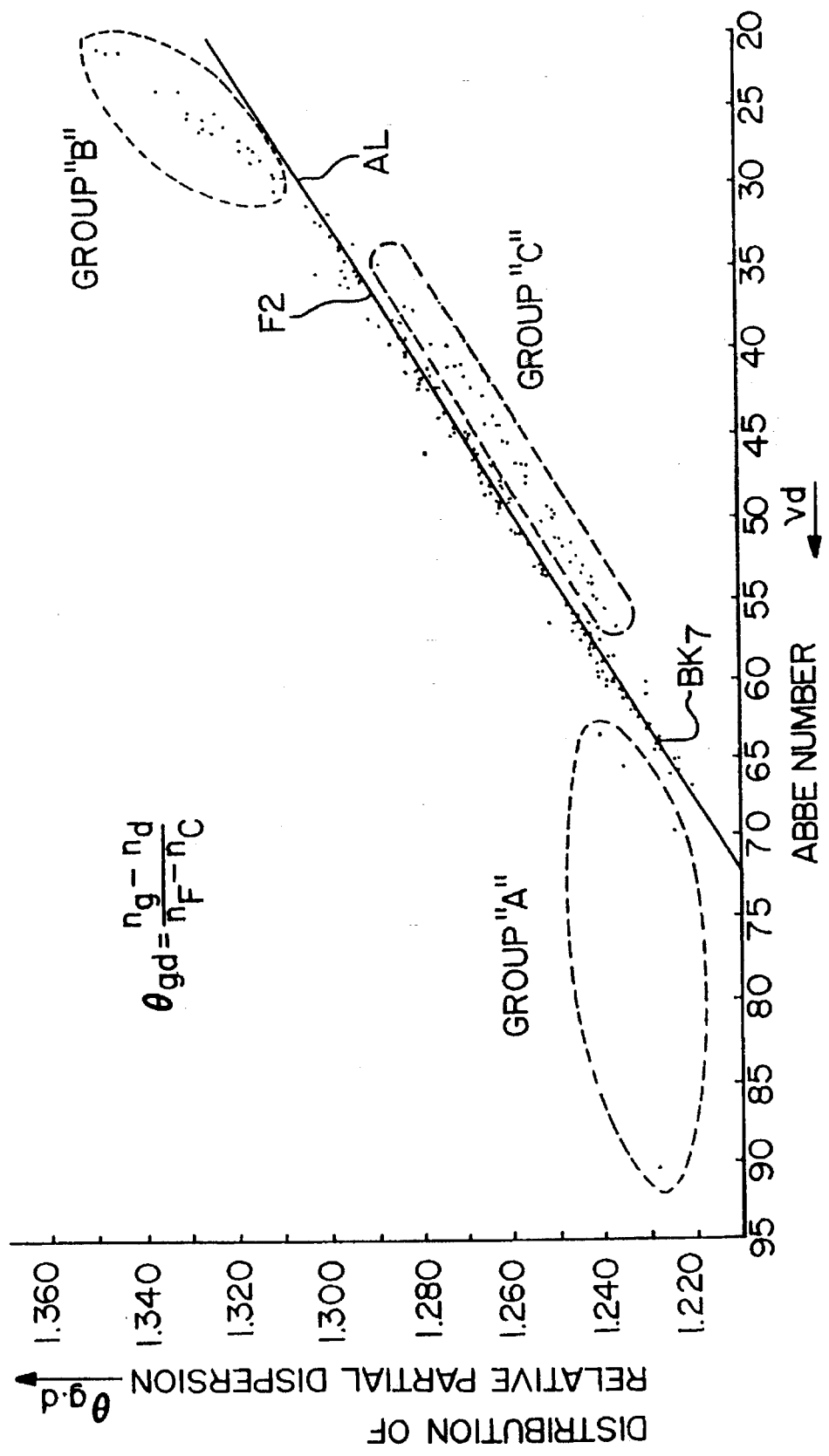
FIG. 1 is a graph showing a distribution of the Abbe number $v_d$ and a distribution of a relative partial dispersion $\theta_{g,d}$ for each glass material.
Figure 2:
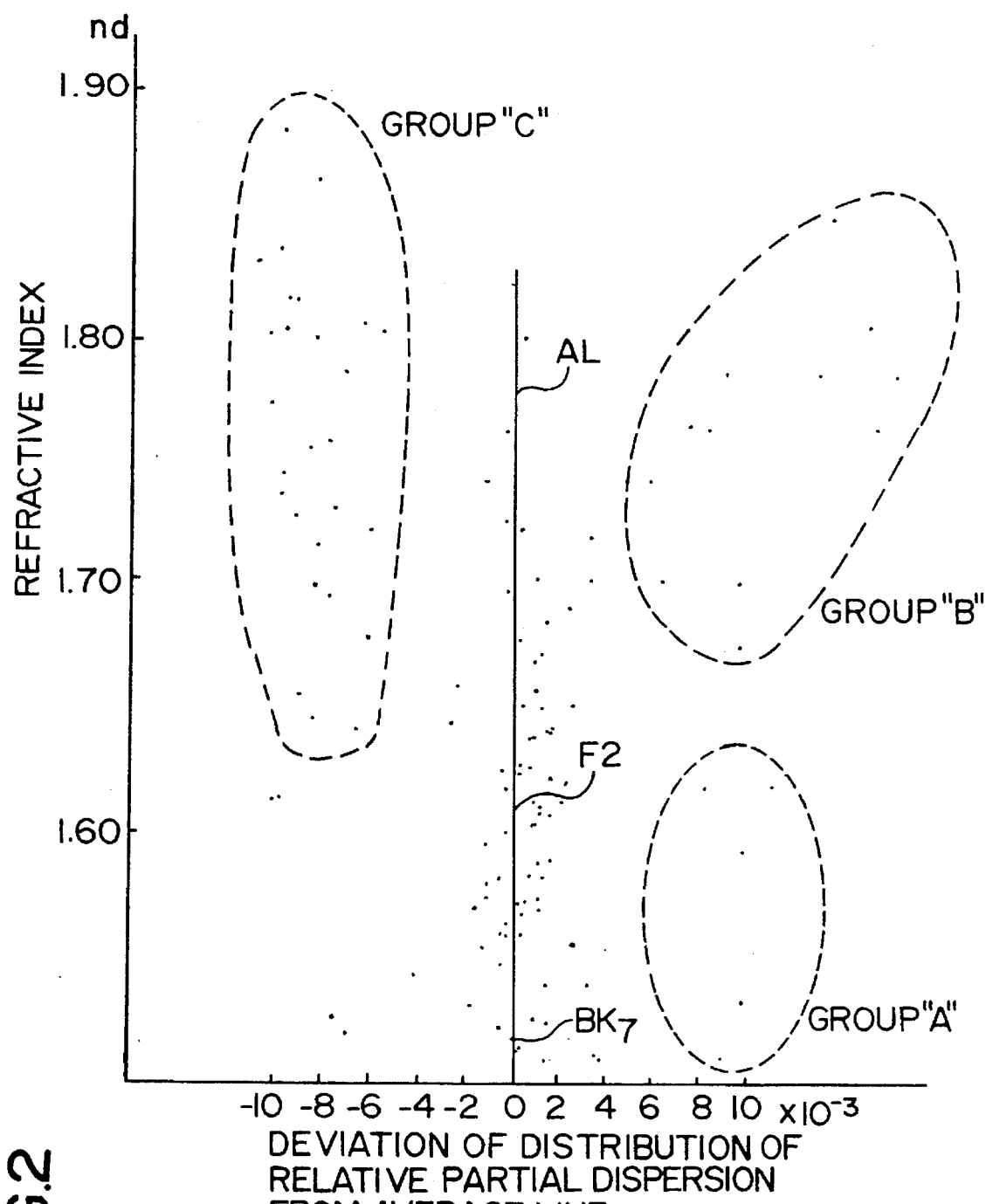
FIG. 2 is a graph showing a distribution of a refractive index n and a deviation of distribution of the relative partial dispersion $\theta_{g,d}$ from an average line at the d-line.

According to the known super achromatic principle, the secondary spectrum (secondary chromatic aberration) can be eliminated or reduced by appropriately selecting the correct relative partial dispersion. FIG. 1 shows a distribution of the Abbe number $v_d$ and a relative partial dispersion $\theta_{g,d}$ for glass materials on the market. FIG. 2 shows a relationship between the refractive index $n_d$ at a d-line and the Abbe number $v_d$ and the relative partial dispersion $\theta_{g,d}$.

To correct for chromatic aberration, it is known to use glass materials having a small Abbe number and a large Abbe number as a negative lens and a positive lens, respectively. To reduce the secondary spectrum, it is necessary to use a glass material in which there is a small difference in the relative partial dispersion. Namely, looking at FIG. 1, it is assumed that the line connecting the points of the typical glass materials BK7 and F2 is an average line AL. From the qualitative viewpoint, a glass material which is represented by plotted points above the average line AL is used for the positive lens, and a glass material which is represented by plotted points below the average line AL is used for the negative lens to reduce the secondary spectrum, respectively.

In the present invention, there are three lens groups consisting of a first negative lens group, a second positive lens group, and a third positive lens group in order to acheive an inexpensive and high quality objective lens for an endoscope. It is necessary to provide at least three lens groups in order to prevent various aberrations. If there are less than three lens groups, it would be impossible to acheive a high quality objective lens having an f-number of about F2.8 and a field angle of about 120°, which can be obtained in the present invention.

In the lens arrangement of the three lens groups (negative, positive, and positive lens groups), it is theoretically possible to make a positive lens of the second lens group or the third lens group of a glass material which is represented by plotted points above the average line AL in FIG. 1, to thereby reduce the secondary spectrum. However, the glass material represented by the points plotted above the average line AL has a large Abbe number and a low refractive index (belonging to a group "A" in FIGS. 1 and 2), or a small Abbe number and a high refractive index ( belonging to a group "B" in FIGS. 1 and 2), which are not necessarily appropriate. Namely, the glass material whose refractive index is low causes the radius of curvature of each lens to decrease, thus resulting in an increase in aberrations, such as spherical aberration or field curvature, etc., or it is difficult to produce such a lens. In addition, for glass material whose refractive index is low, it is very difficult to compensate for the spherical abberation.

Similarly, it is theoretically possible to make a negative lens of the first lens group or a negative lens within the second or third lens group of a glass material which is represented by the points plotted below the average line AL in FIG. 1, to thereby reduce the secondary spectrum. The glass material represented by the points plotted below the average line AL has an intermediate Abbe number and a high refractive index (belonging to a group "C" in FIGS. 1 and 2). However, it is preferable that the negative lens within the second or third lens group is made of a glass material having a small Abbe number to correct the chromatic aberration, and accordingly, the glass materials belonging to group "C" are not recommendable.

In view of the analysis mentioned above, the best option is to use a glass material whose relative partial dispersion $\theta_{d,g}$ is below the average line AL nd whose Abbe number is as small as possible, for the first lens group.

As mentioned above, however, the refractive index of the glass material below the average line AL is high. For instance, known glass materials LASF08, LASF09, LASK01, or KZFS40, etc., that are used in the embodiments of the present invention are below the average line AL and have a high refractive index. Consequently, if the first lens is made of a glass material below the average line AL, not only can the secondary spectrum be effectively reduced, but also the radius of curvature can be increased, thus resulting in a reduction of the spherical aberration. Moreover, the first lens can be easily produced. However, the Petzval sum and the field of curvature are both increased.

The basic concept of the present invention is to solve the problem with an increase in the Petzval sum which is caused by the use of a glass material below the average line AL as the first lens. The inventors of the present application have found that the problem is solved by increasing the negative power of the first lens, so that the increased Petzval sum can be adjusted by a large negative Petzval value caused by the second surface of the first lens.

Formula (1) specifies the relative partial dispersion $\theta_{g,d}$ of the glass material of which the first lens is to be made. If the value of $\theta_{g,d}$ is larger than the upper limit, the secondary spectrum cannot be effectively reduced, and accordingly, a large chromatic aberration occurs.

Formula (2) specifies the power of the first lens group in connection with formula (1). If the value of formula (2) is smaller than the lower limit, the power of the first lens Group is too small to reduce the Petzval sum, so that the curvature of the field increases. Conversely, if the value of formula (2) is larger than the upper limit, the power is so strong that there is a large spherical aberration and coma, thus resulting in a deteriorated contrast of an object image.

Preferably, the objective lens satisfies formulae (3) and (4) to enhance the optical performance thereof. Formula (3) specifies the Abbe number of the glass material of which the first lens Group is to be made. If the Abbe number is below the upper limit, the chromatic aberration as well as other aberrations can be effectively and easily corrected.

Formula (4) specifies the refractive indexes of the positive lens and the negative lens belonging to the third lens group. If the value of formula (4) is above the lower limit, the transverse chromatic aberration can be considerably reduced, while restricting the pherical aberration, axial chromatic aberration, coma and astigmatism within an acceptable range.

If the objective lens satisfies formulae (5) and (6), the abberation off-axis and on-axis has been corrected to an acceptable level, so that a uniform and acceptable optical performance can be obtained over the whole image plane.

Formula (5) specifies the radius of curvature of the surface of the second lens group that is located closest to an object image. If the surface satisfies the requirement defined in formula (5), an over-correction of the spherical aberration, chromatic aberration, and negative Petzval value caused in the first lens group can be appropriately cancelled, so that the axial performance and off-axis performance can be well balanced and kept uniform.

To keep a better balance of the axial performance and off-axis performance, it is preferable that the objective lens satisfies the following relationship (5');

$$-1.0 < R_A/f < -0.8. \quad (5')$$

Formula (6) specifies the distance between the first and second lens groups to keep the balance of the aberration therebetween in connection with formula (5). In the present invention, the first lens group has a relatively strong power to reduce the Petzval sum, as mentioned above. Consequently, over-correction of aberrations, and particularly, over-correction of spherical aberration and chromatic aberration occurs in the first lens group. Such over-correction of aberrations can be cancelled by the under correction of aberration caused by the second lens group having a positive power. To ensure a reliable cancellation, the distance between the first and second lens groups must be within the limits defined by formula (6). If the distance is out of these limits, no appropriate cancellation is effected, so that the spherical aberration and chromatic aberration remain, and hence the image quality is deteriorated. Furthermore, the lower limit in formula (6) is necessary to obtain a physical distance between the first and second lens groups.

Figure 3:
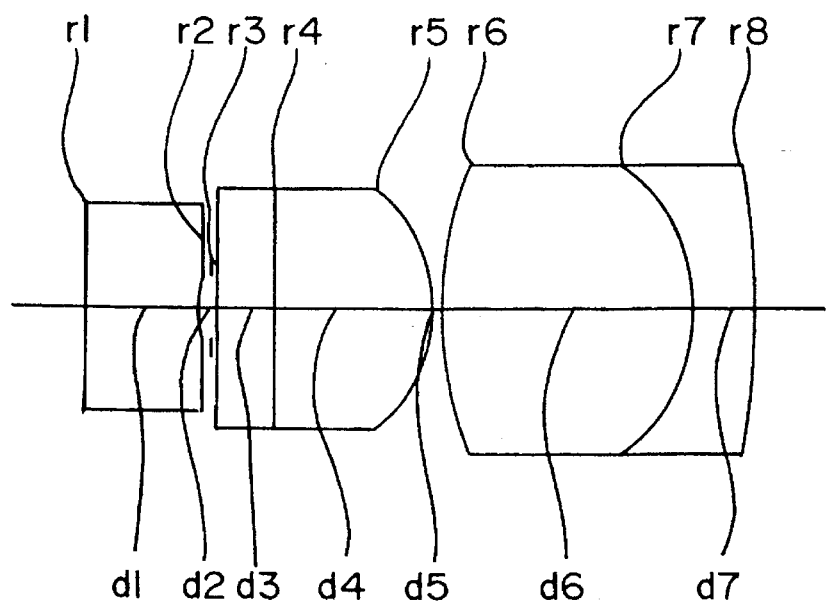
FIG. 3 is a schematic view of a lens arrangement of an objective lens for an endoscope, according to a first embodiment of the present invention.

First Embodiment:

FIG. 3 shows a lens arrangement of an objective lens, according to a first embodiment of the present invention.

The second lens group is comprised of a cemented lens consisting of a plane-parallel plate and a positive lens. The third lens group is comprised of a cemented lens consisting of a positive lens and a negative lens.

Numerical data of the objective lens shown in FIG. 3 is shown in Table 1 below. Diagrams of various aberrations thereof are shown in FIG. 4.

Figure 4:
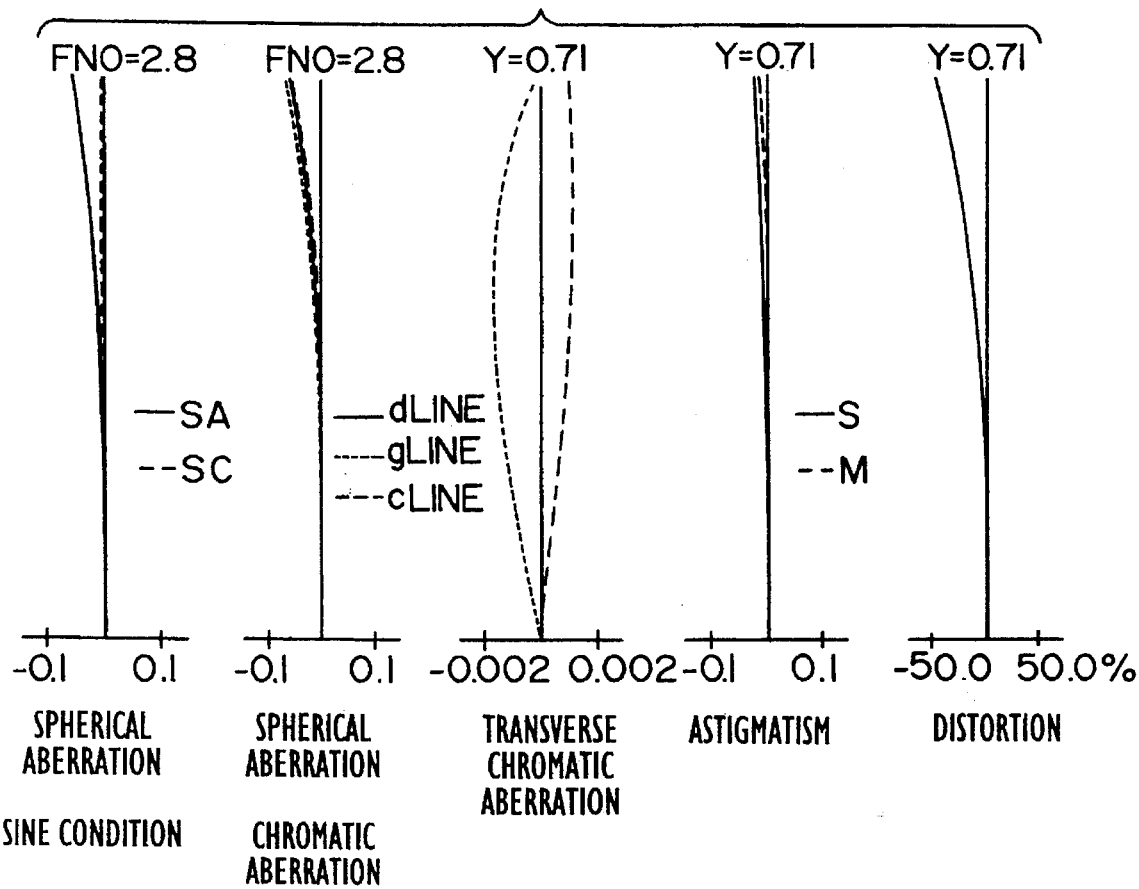
FIG. 4 shows various aberration diagrams of the objective lens shown in FIG. 3.

In FIG. 4, "SA" represents the spherical aberration, "SC" the sine condition, "d-line", "g-line" and "C-line" the chromatic aberration represented by the spherical aberration and the transverse chromatic aberration, at the respective wavelengths, "S" the sagittal ray, and "M" the meridional ray, respectively.

In the tables and the drawings, "$F_{NO}$" represents the f-number, "f" the focal length, "$1\omega$" the half angle of view, "$f_B$" the back-focal distance, "$r_i$" the radius of curvature of each lens surface, "$d_i$" the lens thickness or the distance between the lenses "$N_d$" the refractive index of the d-line, and "$v_d$" the Abbe number of the d-line respectively.

TABLE 1

$F_{NO} = 1:2.89$
$f = 0.82$
$M = -0.080$
$\omega = 59.6°$
$f_B = 0.66$

| surface N$_o$ | r$_i$ | d$_i$ | N$_d$ | v$_d$ |
|---|---|---|---|---|
| 1 | ∞ | 0.60 | 1.88300 | 40.8 |
| 2 | 0.779 | 0.05 | — | — |
| STOP | ∞ | 0.03 | — | — |
| 3 | ∞ | 0.30 | 1.84666 | 23.8 |
| 4 | ∞ | 0.76 | 1.72916 | 54.7 |
| 5 | −0.776 | 0.03 | — | — |
| 6 | 1.979 | 1.26 | 1.77250 | 49.6 |
| 7 | −0.889 | 0.30 | 1.92286 | 21.3 |

TABLE 1-continued $F_{NO} = 1:2.89$
$f = 0.82$
$M = -0.080$
$\omega = 59.6°$
$f_B = 0.66$

| surface N$_o$ | r$_i$ | d$_i$ | N$_d$ | v$_d$ |
|---|---|---|---|---|
| 8 | −4.572 | — | — | — |

In the first embodiment, the refractive indexes $N_g$, $N_F$, and $N_C$ of the first lens at the g-line, F-line and C-line are as follows:

$N_g$: 1.91049

$N_F$: 1.89822

$N_C$: 1.87656

Figure 5:
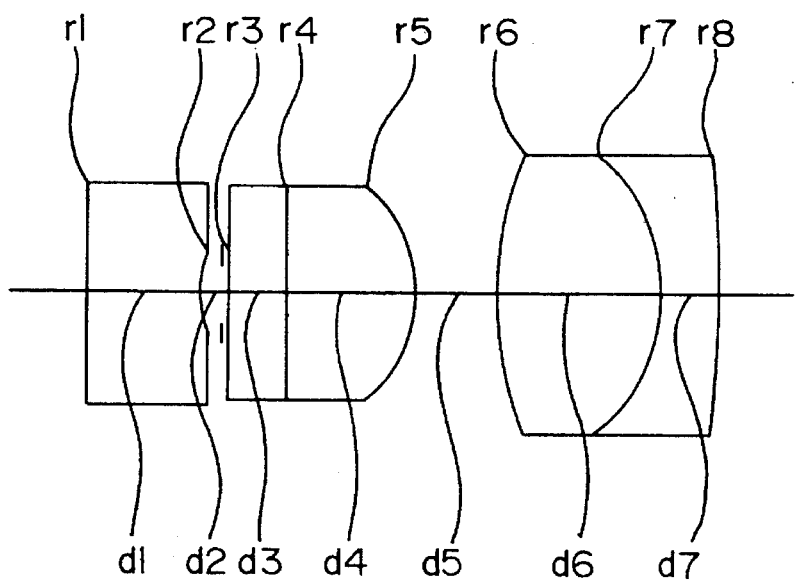
FIG. 5 is a schematic view of a lens arrangement of an objective lens for an endoscope, according to the second embodiment of the present invention.

Second Embodiment:

FIG. 5 shows a lens arrangement of an objective lens, according to a second embodiment of the present invention.

The second lens group is comprised of a cemented lens consisting of a plane-parallel plate and a positive lens. The third lens group is comprised of a cemented lens consisting of a positive lens and a negative lens.

Figure 6:
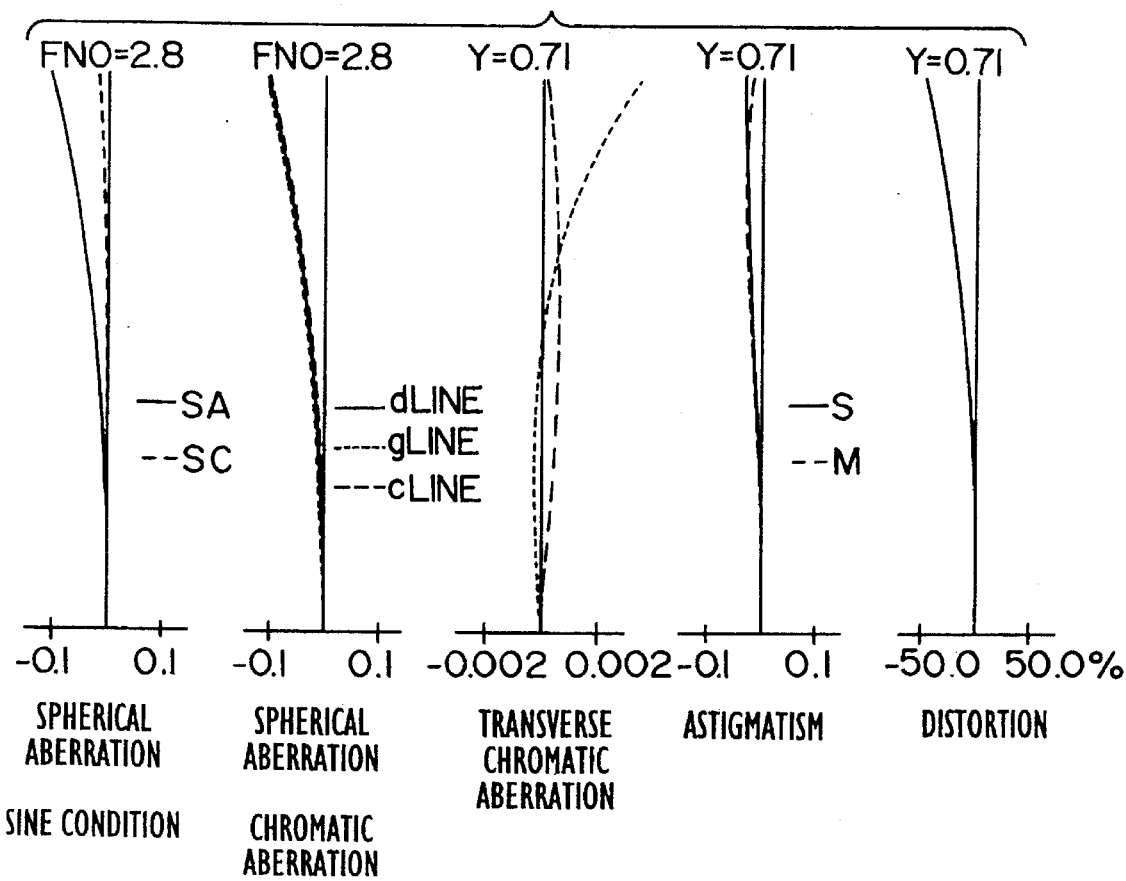
FIG. 6 shows various aberration diagrams of the objective lens shown in FIG. 5.

Numerical data of the lens system shown in FIG. 5 is shown in Table 2 below. Diagrams of various aberrations thereof are shown in FIG. 6.

TABLE 2

$F_{NO} = 1:2.86$
$f = 0.82$
$M = -0.080$
$\omega = 59.7°$
$f_B = 0.75$

| surface N$_o$ | r$_i$ | d$_i$ | N$_d$ | v$_d$ |
|---|---|---|---|---|
| 1 | ∞ | 0.60 | 1.88300 | 40.8 |
| 2 | 0.677 | 0.11 | — | — |
| STOP | ∞ | 0.03 | — | — |
| 3 | ∞ | 0.30 | 1.84666 | 23.8 |
| 4 | ∞ | 0.64 | 1.72916 | 54.7 |
| 5 | −0.710 | 0.42 | — | — |
| 6 | 1.878 | 0.84 | 1.77250 | 49.6 |
| 7 | −0.895 | 0.30 | 1.92286 | 21.3 |
| 8 | −7.439 | — | — | — |

In the second embodiment, the refractive indexes $N_g$, $N_F$, and $N_C$ of the first lens at the g-line, F-line and C-line are as follows:

$N_g$: 1.91049

$N_F$: 1.89822

$N_C$: 1.87656

Figure 7:
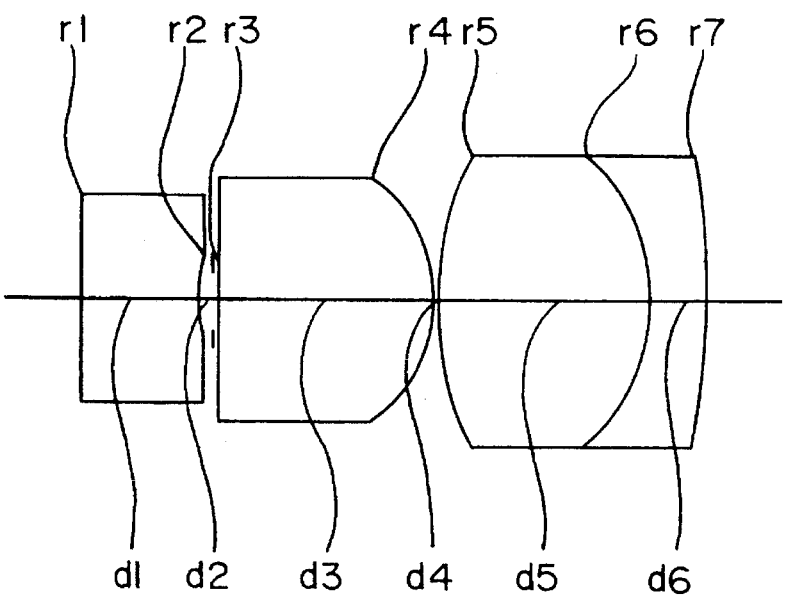
FIG. 7 is a schematic view of a lens arrangement of an objective lens for an endoscope, according to a third embodiment of the present invention.

Third Embodiment:

FIG. 7 shows a lens arrangement of an objective lens, according to a third embodiment of the present invention.

The second lens group is comprised of a single positive lens. The third lens group is comprised of a cemented lens consisting of a positive lens and a negative lens.

Figure 8:
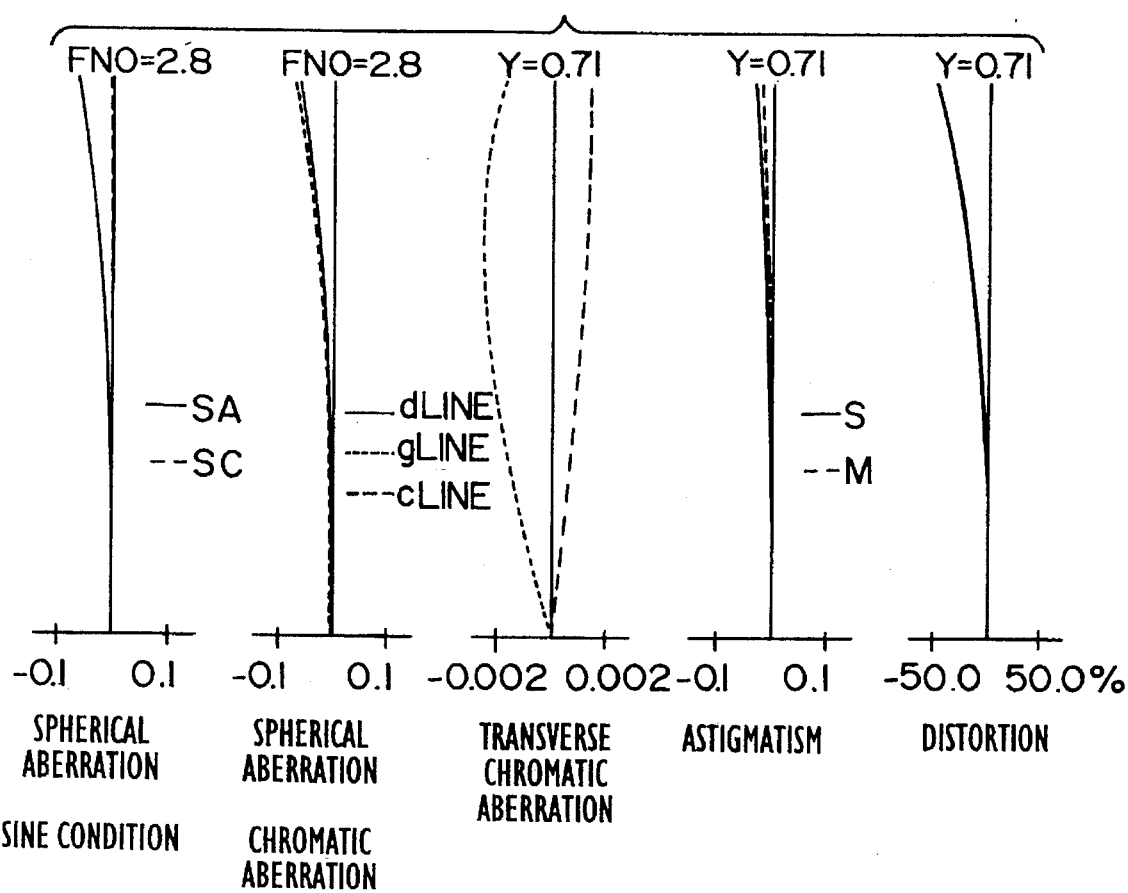
FIG. 8 shows various aberration diagrams of the objective lens shown in FIG. 7.

Numerical data of the lens system shown in FIG. 7 is shown in Table 3 below. Diagrams of various aberrations thereof are shown in FIG. 8.

TABLE 3

| | $F_{NO} = 1:2.89$ | | | |
| | $f = 0.83$ | | | |
| | $M = -0.081$ | | | |
| | $\omega = 59.6°$ | | | |
| | $f_B = 0.81$ | | | |
| surface $N_o$ | $r_i$ | $d_i$ | $N_d$ | $\nu_d$ |
|---|---|---|---|---|
| 1 | ∞ | 0.60 | 1.88300 | 40.8 |
| 2 | 0.749 | 0.07 | — | — |
| STOP | ∞ | 0.03 | — | — |
| 3 | ∞ | 1.08 | 1.72916 | 54.7 |
| 4 | −0.791 | 0.05 | — | — |
| 5 | 1.785 | 1.07 | 1.69100 | 54.8 |
| 6 | −0.938 | 0.30 | 1.92286 | 21.3 |
| 7 | −3.591 | — | — | — |

In the third embodiment, the refractive indexes $N_g$, $N_F$, and $N_C$ of the first lens at the g-line, F-line and C-line are as follows:

$N_g$: 1.91049

$N_F$: 1.89822

$N_C$: 1.87656

Figure 9:
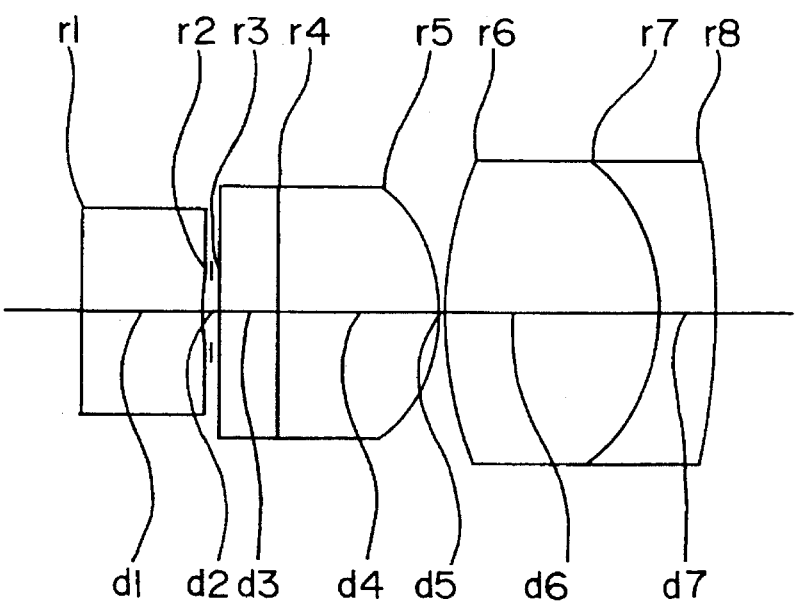
FIG. 9 is a schematic view of a lens arrangement of an objective lens for an endoscope, according to a fourth embodiment of the present invention.

Fourth Embodiment:

FIG. 9 shows a lens arrangement of an objective lens, according to a fourth embodiment of the present invention.

The second lens group is comprised of a cemented lens consisting of a plane-parallel plate and a positive lens. The third lens group is comprised of a cemented lens consisting of a positive lens and a negative lens.

Figure 10:
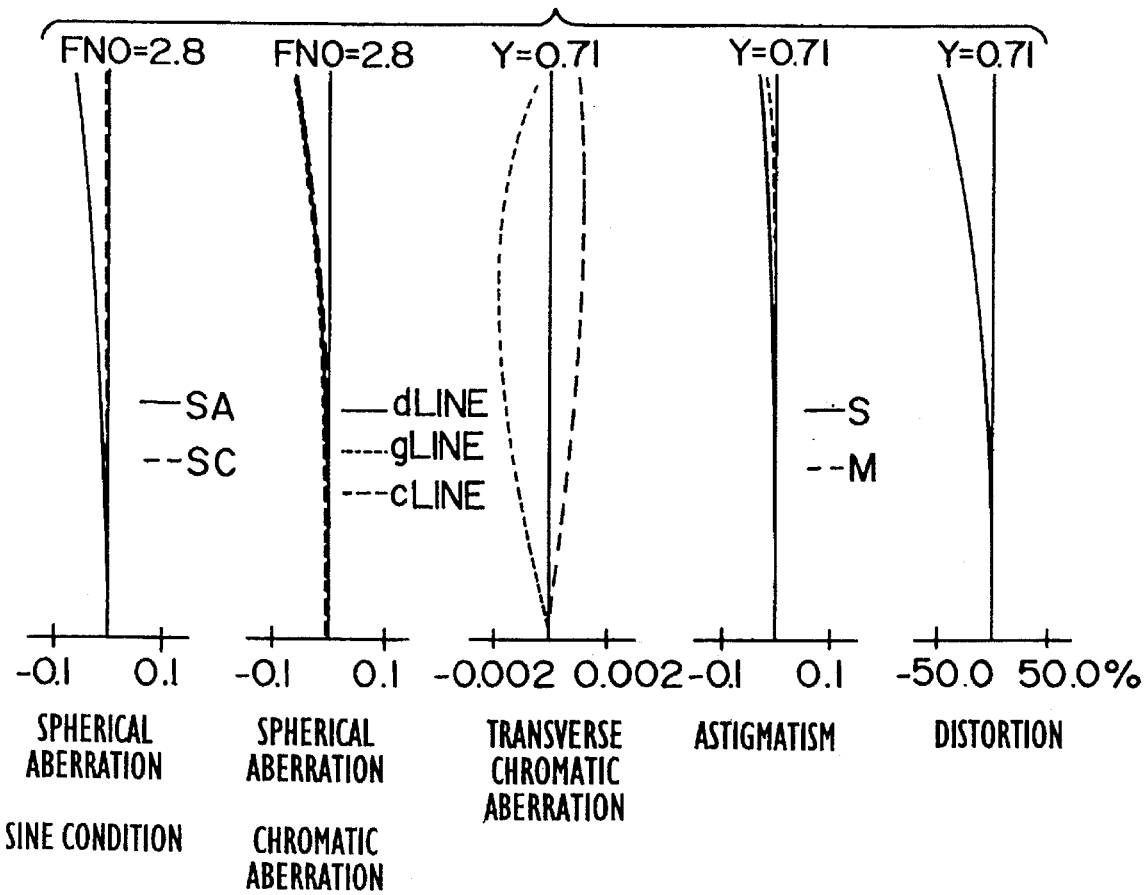
FIG. 10 shows various aberration diagrams of the objective lens shown in FIG. 9.

Numerical data of the lens system shown in FIG. 9 is shown in Table 4 below. Diagrams of various aberrations thereof are shown in FIG. 10.

TABLE 4

| | $F_{NO} = 1:2.81$ | | | |
| | $f = 0.83$ | | | |
| | $M = -0.080$ | | | |
| | $\omega = 60.2°$ | | | |
| | $f_B = 0.79$ | | | |
| surface $N_o$ | $r_i$ | $d_i$ | $N_d$ | $\nu_d$ |
|---|---|---|---|---|
| 1 | ∞ | 0.60 | 1.88300 | 40.8 |
| 2 | 0.823 | 0.05 | — | — |
| STOP | ∞ | 0.03 | — | — |
| 3 | ∞ | 0.30 | 1.84666 | 23.8 |
| 4 | ∞ | 0.80 | 1.72916 | 54.7 |
| 5 | −0.806 | 0.03 | — | — |
| 6 | 2.089 | 1.08 | 1.77250 | 49.6 |
| 7 | −0.950 | 0.30 | 1.92286 | 21.3 |
| 8 | −3.909 | — | — | — |

In the fourth embodiment, the refractive indexes $N_g$, $N_F$, and $N_C$ of the first lens at the g-line, F-line and C-line are as follows:

$N_g$: 1.91049

$N_F$: 1.89822

$N_C$: 1.87656

Figure 11:
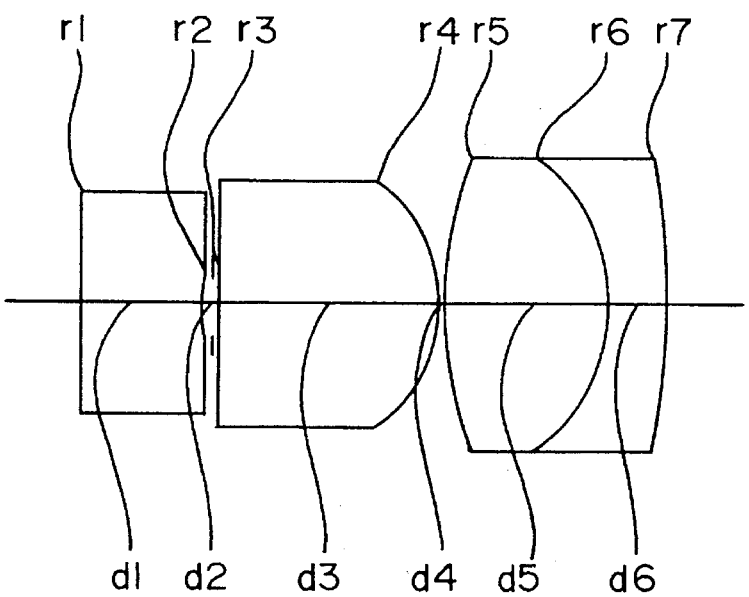
FIG. 11 is a schematic view of a lens arrangement of an objective lens for an endoscope, according to a fifth embodiment of the present invention.

Fifth Embodiment:

FIG. 11 shows a lens arrangement of an objective lens, according to a fifth embodiment of the present invention.

The second lens group is comprised of single positive lens. The third lens group is comprised of a cemented lens consisting of a positive lens and a negative lens.

Figure 12:
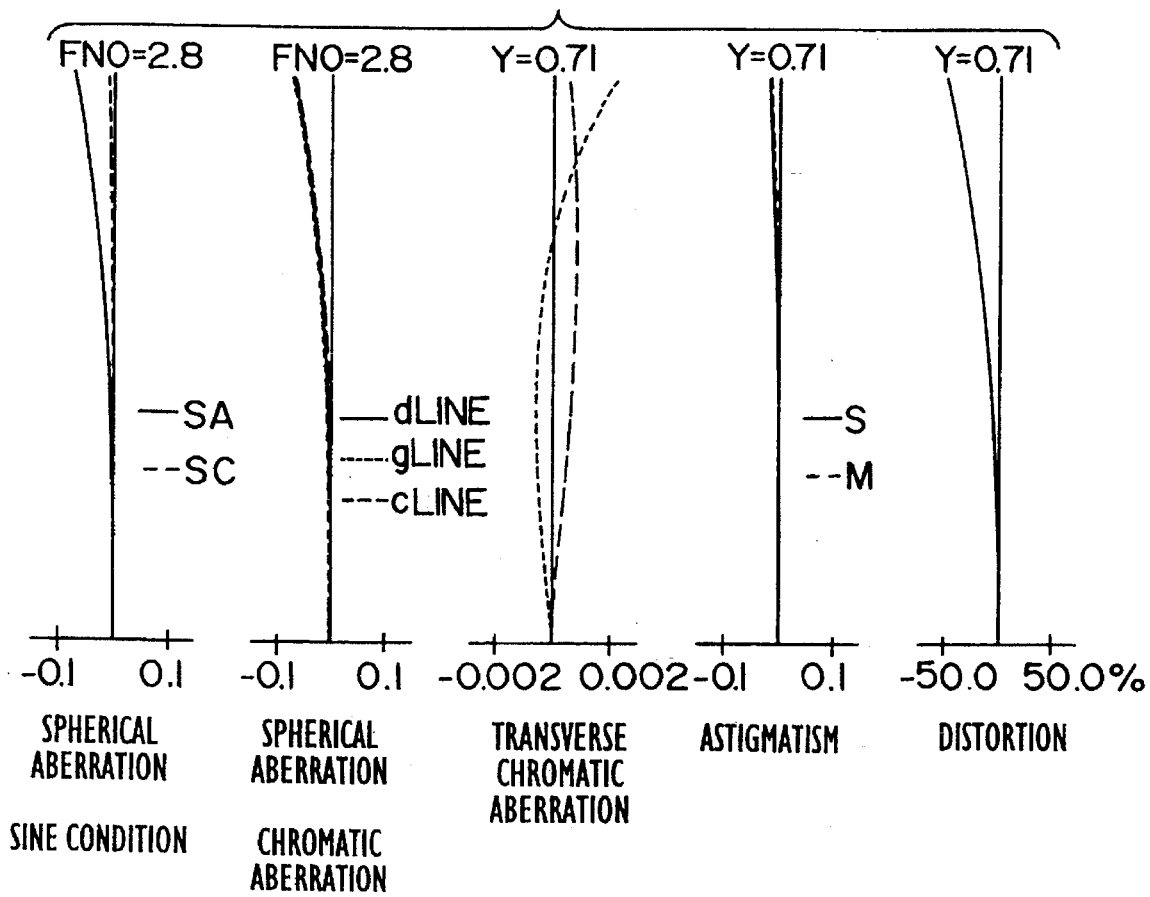
FIG. 12 shows various aberration diagrams of the objective lens shown in FIG. 11.

Numerical data of the lens system shown in FIG. 11 is shown in Table 5 below. Diagrams of various aberrations thereof are shown in FIG. 12.

TABLE 5

| | $F_{NO} = 1:2.82$ | | | |
| | $f = 0.82$ | | | |
| | $M = -0.079$ | | | |
| | $\omega = 60.2°$ | | | |
| | $f_B = 0.93$ | | | |
| surface $N_o$ | $r_i$ | $d_i$ | $N_d$ | $\nu_d$ |
|---|---|---|---|---|
| 1 | ∞ | 0.60 | 1.75500 | 52.3 |
| 2 | 0.680 | 0.07 | — | — |
| STOP | ∞ | 0.03 | — | — |
| 3 | −27.654 | 1.08 | 1.72916 | 54.7 |
| 4 | −0.765 | 0.03 | — | — |
| 5 | 2.028 | 0.83 | 1.72916 | 54.7 |
| 6 | −0.913 | 0.30 | 1.92286 | 21.3 |
| 7 | −4.060 | — | — | — |

In the fifth embodiment, the refractive indexes $N_g$, $N_F$, and $N_C$ of the first lens at the g-line, F-line and C-line are as follows:

$N_g$: 1.77296

$N_F$: 1.76506

$N_C$: 1.75063

Figure 13:
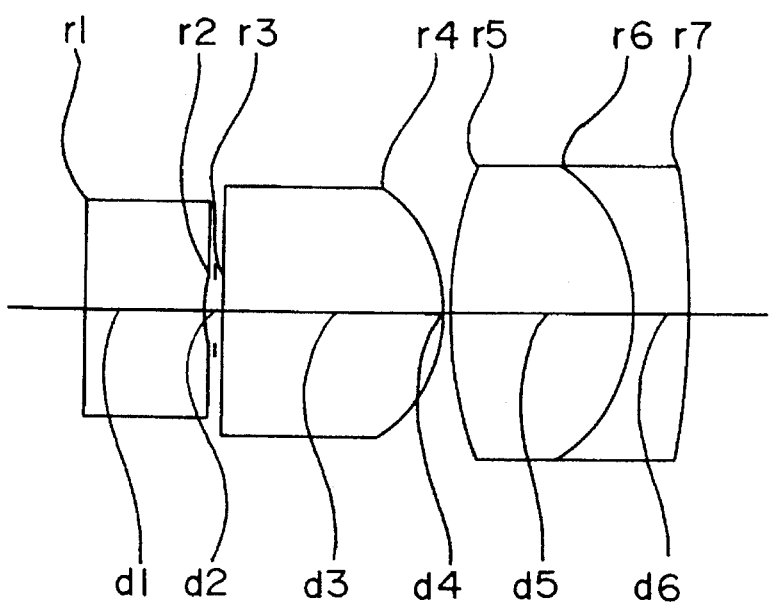
FIG. 13 is a schematic view of a lens arrangement of an objective lens for an endoscope, according to a sixth embodiment of the present invention.

Sixth Embodiment:

FIG. 13 shows a lens arrangement of an objective lens, according to a sixth embodiment of the present invention.

The second lens group is comprised of a single positive lens. The third lens group is comprised of a cemented lens consisting of a positive lens and a negative lens.

Figure 14:
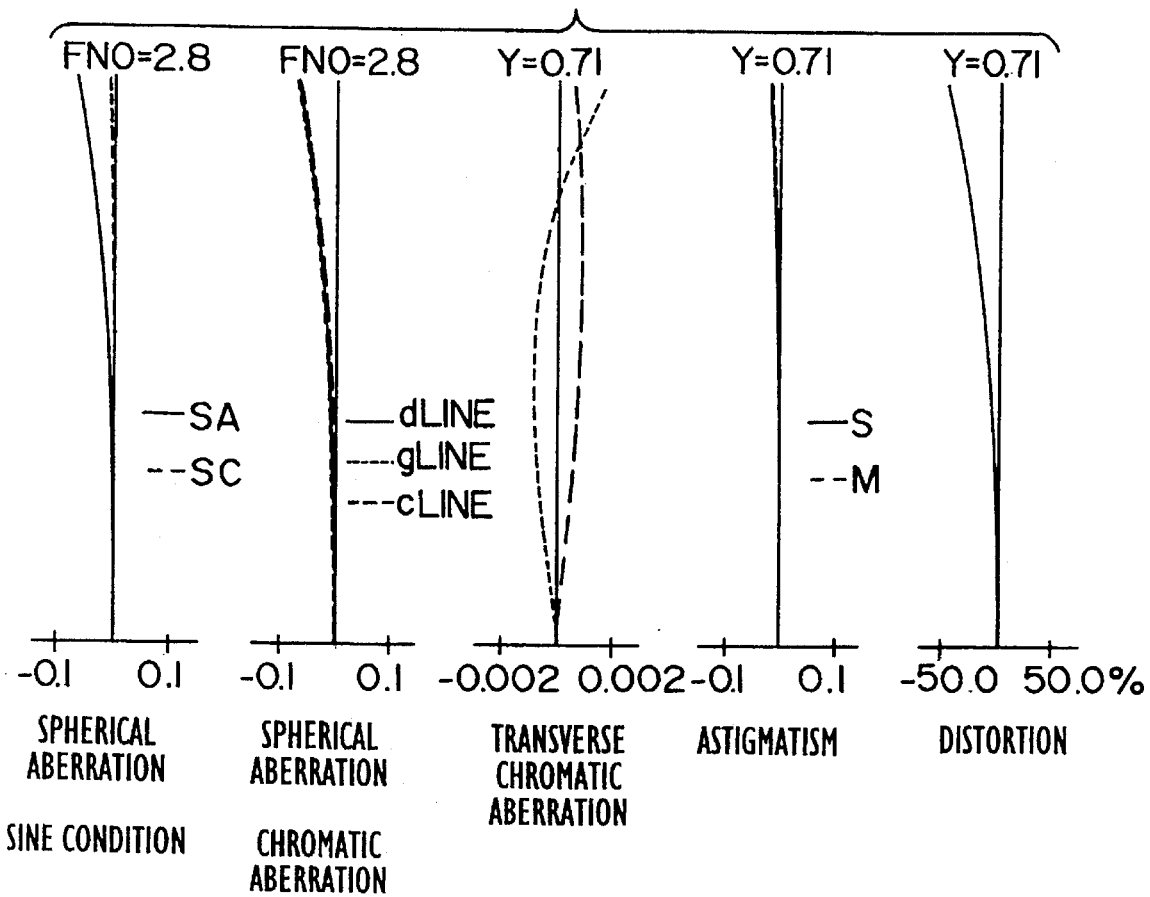
FIG. 14 shows various aberration diagrams of the objective lens shown in FIG. 13.

Numerical data of the lens system shown in FIG. 13 is shown in Table 6 below. Diagrams of various aberrations thereof are shown in FIG. 14.

TABLE 6

| | $F_{NO} = 1:2.83$ | | | |
| | $f = 0.82$ | | | |
| | $M = -0.080$ | | | |
| | $\omega = 60.0°$ | | | |
| | $f_B = 0.93$ | | | |
| surface $N_o$ | $r_i$ | $d_i$ | $N_d$ | $\nu_d$ |
|---|---|---|---|---|
| 1 | ∞ | 0.60 | 1.81600 | 46.6 |
| 2 | 0.680 | 0.06 | — | — |
| STOP | ∞ | 0.03 | — | — |
| 3 | −377.890 | 1.09 | 1.72916 | 54.7 |
| 4 | −0.775 | 0.03 | — | — |
| 5 | 2.035 | 0.92 | 1.72916 | 54.7 |
| 6 | −0.898 | 0.30 | 1.92286 | 21.3 |
| 7 | −3.775 | — | — | — |

In the sixth embodiment, the refractive indexes $N_g$, $N_F$, and $N_C$ of the first lens at the g-line, F-line and C-line are as follows:

$N_g$: 1.83800

$N_F$: 1.82825

$N_C$: 1.81075

Figure 15:
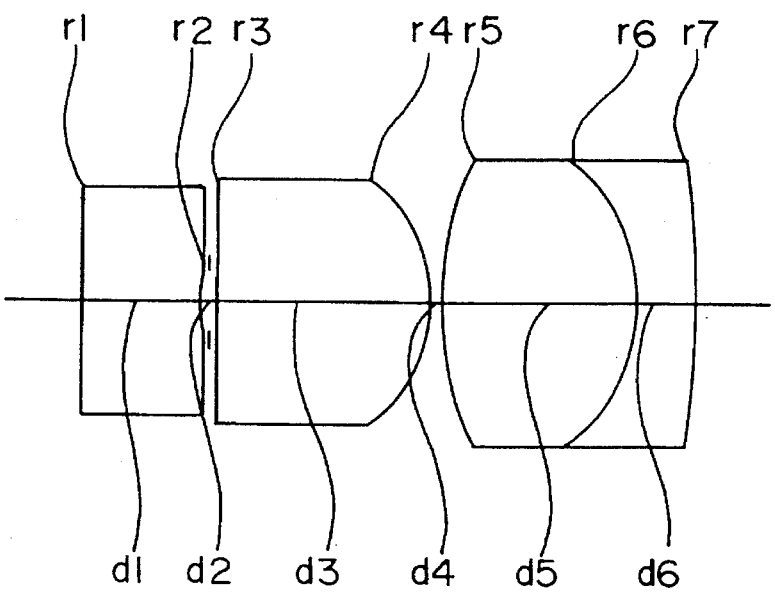
FIG. 15 is a schematic view of a lens arrangement of an objective lens for an endoscope, according to a seventh embodiment of the present invention.

Seventh Embodiment:

FIG. 15 shows a lens arrangement of an objective lens, according to a seventh embodiment of the present invention.

The second lens group is comprised of a single positive lens. The third lens group is comprised of a cemented lens consisting of a positive lens and a negative lens.

Figure 16:
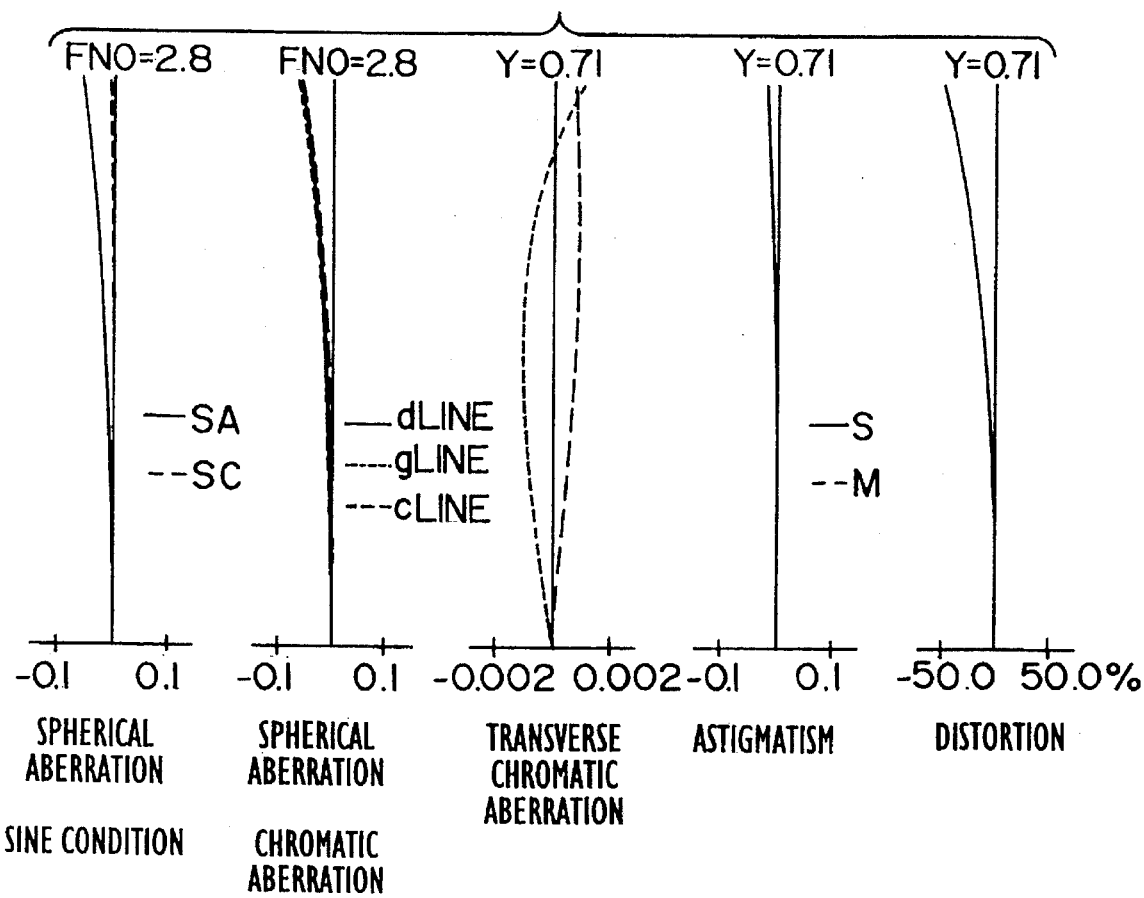
FIG. 16 shows various aberration diagrams of the objective lens shown in FIG. 15.

Numerical data of the lens system shown in FIG. 15 is shown in Table 7 below. Diagrams of various aberrations thereof are shown in FIG. 16.

TABLE 7

$F_{NO} = 1:2.78$
$f = 0.82$
$M = -0.079$
$\omega = 60.2°$
$f_B = 0.72$

| surface $N_o$ | $r_i$ | $d_i$ | $N_d$ | $v_d$ |
|---|---|---|---|---|
| 1 | ∞ | 0.60 | 1.67650 | 37.5 |
| 2 | 0.608 | 0.05 | — | — |
| STOP | ∞ | 0.03 | — | — |
| 3 | 28.257 | 1.06 | 1.72916 | 54.7 |
| 4 | −0.759 | 0.07 | — | — |
| 5 | 1.767 | 0.97 | 1.72916 | 54.7 |
| 6 | −0.905 | 0.30 | 1.92286 | 21.3 |
| 7 | −6.200 | — | — | — |

In the seventh embodiment, the refractive indexes $N_g$, $N_F$, and $N_C$ of the first lens at the g-line, F-line and C-line are as follows:

$N_g$: 1.69958

$N_F$: 1.68919

$N_C$: 1.67117

Figure 17:
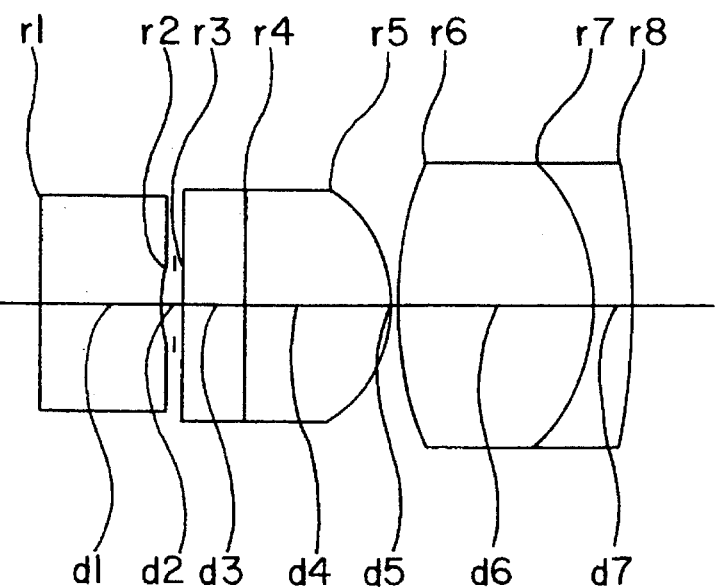
FIG. 17 is a schematic view of a lens arrangement of an objective lens for an endoscope, according to an eighth embodiment of the present invention.

Eighth Embodiment:

FIG. 17 shows a lens arrangement of an objective lens, according to an eighth embodiment of the present invention.

The second lens group is comprised of a cemented lens consisting of a negative lens and a positive lens. The third lens group is comprised of a cemented lens consisting of a positive lens and a negative lens.

Figure 18:
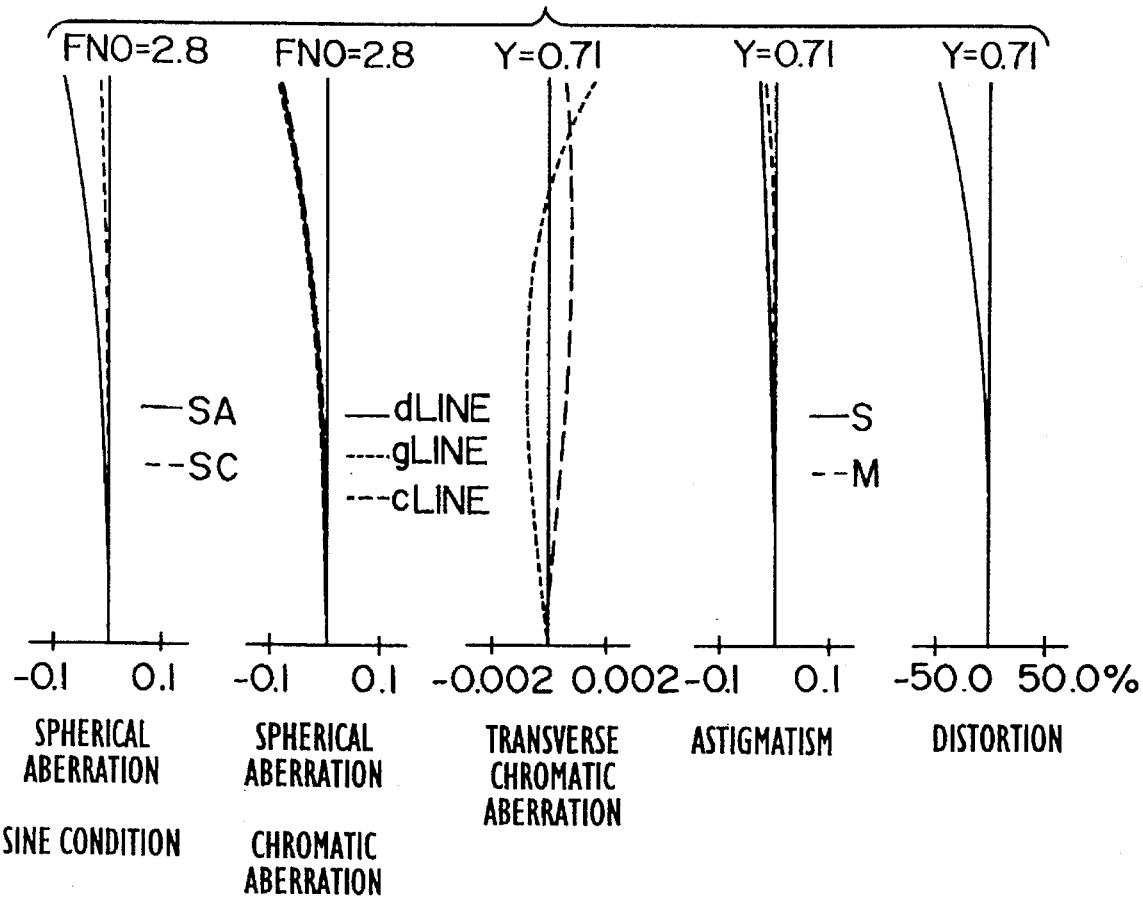
FIG. 18 shows various aberration diagrams of the objective lens shown in FIG. 17.

Numerical data of the lens system shown in FIG. 17 is shown in Table 8 below. Diagrams of various aberrations thereof are shown in FIG. 18.

TABLE 8

$F_{NO} = 1:2.91$
$f = 0.82$
$M = -0.080$
$\omega = 60.2°$
$f_B = 0.87$

| surface $N_o$ | $r_i$ | $d_i$ | $N_d$ | $v_d$ |
|---|---|---|---|---|
| 1 | ∞ | 0.60 | 1.88300 | 40.8 |
| 2 | 0.781 | 0.07 | — | — |
| STOP | ∞ | 0.02 | — | — |
| 3 | −19.211 | 0.32 | 1.84666 | 23.8 |
| 4 | −331.844 | 0.70 | 1.69100 | 54.8 |
| 5 | −0.715 | 0.03 | — | — |
| 6 | 2.063 | 1.01 | 1.72916 | 54.7 |
| 7 | −0.904 | 0.20 | 1.92286 | 21.3 |
| 8 | −3.385 | — | — | — |

In the eighth embodiment, the refractive indexes $N_g$, $N_F$, and $N_C$ of the first lens at the g-line, F-line and C-line are as follows:

$N_g$: 1.91049

$N_F$: 1.89822

$N_C$: 1.87656

Figure 19:
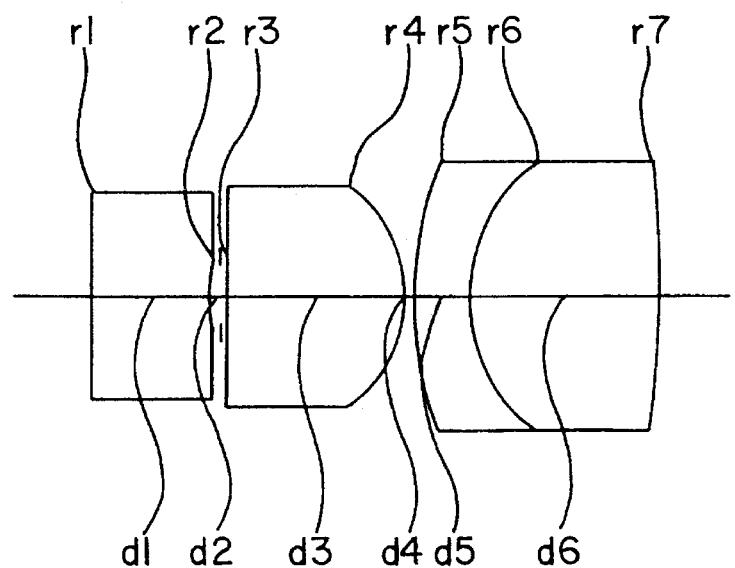
FIG. 19 is a schematic view of a lens arrangement of an objective lens for an endoscope, according to a ninth embodiment of the present invention; and, FIG. 20 shows various aberration diagrams of the objective lens shown in FIG. 19.

Ninth Embodiment:

FIG. 19 shows a lens arrangement of an objective lens, according to a ninth embodiment of the present invention.

The second lens group is comprised of a single positive lens. The third lens group is comprised of a cemented lens consisting of a positive lens and a negative lens.

Figure 20:
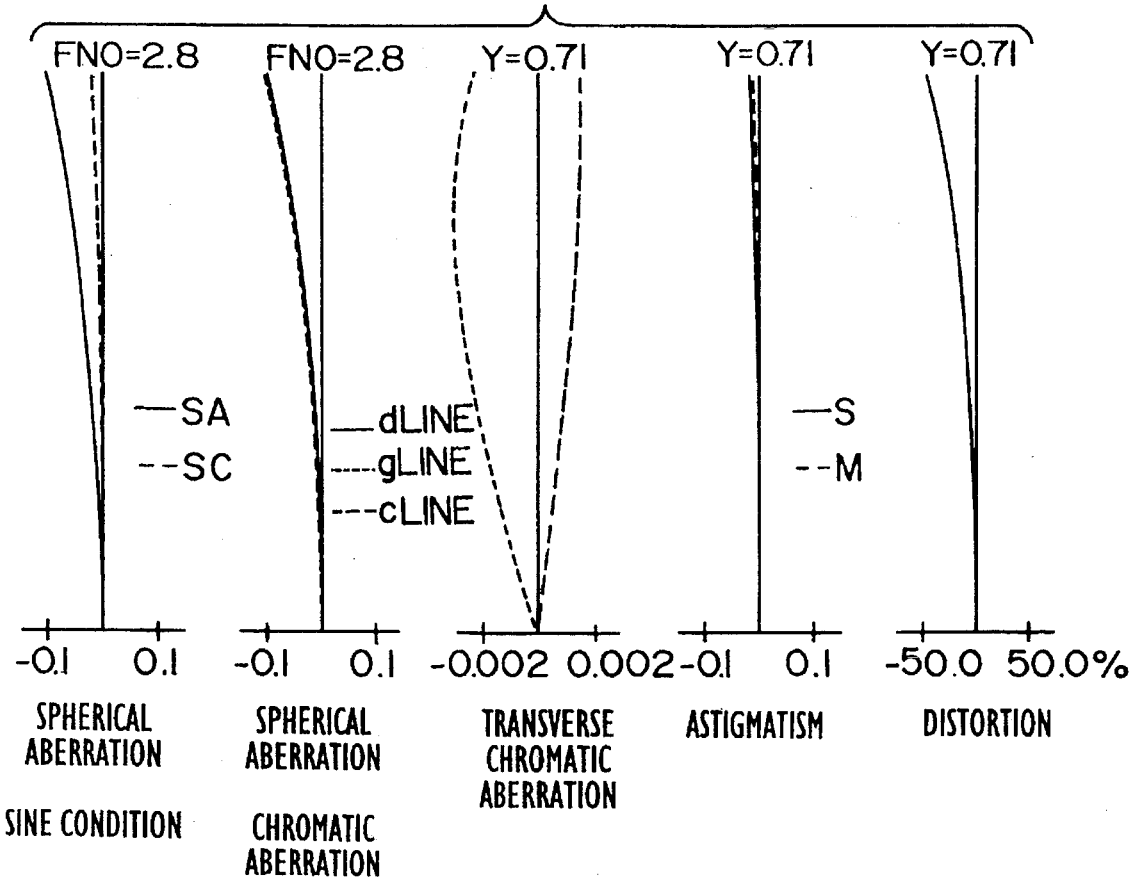

Numerical data of the lens system shown in FIG. 19 is shown in Table 9 below. Diagrams of various aberrations thereof are shown in FIG. 20.

TABLE 9

$F_{NO} = 1:2.83$
$f = 0.82$
$M = -0.080$
$\omega = 59.7°$
$f_B = 0.81$

| surface $N_o$ | $r_i$ | $d_i$ | $N_d$ | $v_d$ |
|---|---|---|---|---|
| 1 | ∞ | 0.60 | 1.88300 | 40.8 |
| 2 | 0.779 | 0.06 | — | — |
| STOP | ∞ | 0.03 | — | — |
| 3 | −4.835 | 0.90 | 1.69100 | 54.8 |
| 4 | −0.675 | 0.03 | — | — |
| 5 | 1.675 | 0.30 | 1.92286 | 21.3 |
| 6 | 0.801 | 0.95 | 1.72916 | 54.7 |
| 7 | −8.462 | — | — | — |

In the ninth embodiment, the refractive indexes $N_g$, $N_F$, and $N_C$ of the first lens at the g-line, F-line and C-line are as follows:

$N_g$: 1.91049

$N_F$: 1.89822

$N_C$: 1.87656

The values of formulae (1) through (6) for each embodiment are shown in Table 10 below.

TABLE 10

| | formula (1) left side | formula (1) right side | formula (2) | formula (3) |
|---|---|---|---|---|
| Embodiment 1 | 1.2697 | 1.2743 | −1.072 | 40.8 |
| Embodiment 2 | 1.2697 | 1.2743 | −0.932 | 40.8 |
| Embodiment 3 | 1.2697 | 1.2743 | −1.019 | 40.8 |
| Embodiment 4 | 1.2697 | 1.2743 | −1.125 | 40.8 |
| Embodiment 5 | 1.2451 | 1.2487 | −1.100 | 52.3 |
| Embodiment 6 | 1.2572 | 1.2614 | −1.016 | 46.6 |
| Embodiment 7 | 1.2806 | 1.2816 | −1.102 | 37.5 |
| Embodiment 8 | 1.2697 | 1.2743 | −1.081 | 40.8 |
| Embodiment 9 | 1.2697 | 1.2743 | −1.078 | 40.8 |

| | formula (4) | formula (5) | formula (6) |
|---|---|---|---|
| Embodiment 1 | 0.15036 | −0.943 | 0.100 |
| Embodiment 2 | 0.15036 | −0.863 | 0.165 |
| Embodiment 3 | 0.23186 | −0.895 | 0.114 |
| Embodiment 4 | 0.15036 | −0.973 | 0.100 |
| Embodiment 5 | 0.19370 | −0.934 | 0.116 |
| Embodiment 6 | 0.19370 | −0.945 | 0.112 |
| Embodiment 7 | 0.19370 | −0.930 | 0.101 |
| Embodiment 8 | 0.19370 | −0.881 | 0.116 |
| Embodiment 9 | 0.19370 | −0.824 | 0.107 |

As can be seen from Table 10 above, all of the nine embodiments satisfy the requirements defined by formulae (1) through (6). Moreover, an objective lens for an endoscope according to the present invention has a small transverse chromatic aberration and can effectively correct other aberrations.

As may be understood from the above discussion, according to the present invention, in an objective lens including three lens groups, particularly the transverse chromatic aberration can be effectively reduced. Moreover, an inexpensive objective lens for an endoscope can be obtained.

We claim:

1. An objective lens for an endoscope comprising a first lens group comprising one negative lens, a second positive lens group comprising at least one positive lens, and a third positive lens group comprising one positive lens or a cemented lens including one positive lens and a negative lens adhered to said positive lens of said third positive lens group, as viewed from an object side, wherein the objective lens satisfies the following relationships:

$\Theta_{g,d} < -2.223 \times 10^{-3} \cdot v_d + 1.365$ and $-1.2 < f_1/f < -0.8$ wherein $\Theta_{g,d} = (n_g - n_d)/(n_F - n_C)$ $n_g$ designates a refractive index of the glass material of the first lens group at the g-line;

$n_d$ designates a refractive index of the glass material of the first lens group at the d-line;

$n_F$ designates a refractive index of the glass material of the first lens group at the F-line;

$n_C$ designates a refractive index of the glass material of the first lens group at the C-line;

$v_d$ designates an Abbe number of the glass material of the first lens group;

f1 designates a focal length of the first lens group; and f designates a focal length of the whole lens system.

2. An objective lens according to claim 1, wherein the following relationships are satisfied:

$v_d < 55$ and $n_{n3} - n_{p3} > 0.12$ wherein $n_{n3}$ designates a refractive index of the negative lens in the third lens group at the d-line; and $n_{p3}$ designates a refractive index of the position lens in the third lens group at the d-line.

3. An objective lens according to claim 1, wherein the following relationships are satisfied:

$-1.2 < R_A/f < -0.6$ and $0.05 < d_2/f < 0.3$ wherein $R_A$ designates a radius of curvature of the surface of the second lens group that is located closest to an object image; and $d_2$ designates a distance between the first lens group and the second lens group.

* * * * *

UNITED STATES PATENT AND TRADEMARK OFFICE
CERTIFICATE OF CORRECTION

PATENT NO. : 5,530,591
DATED : June 25, 1996
INVENTOR(S) : S. TACHIHARA et al.

It is certified that error appears in the above-indentified patent and that said Letters Patent is hereby corrected as shown below:

At column 11, line 6 (claim 1, line 12), change "$n_f$" to --$n_F$--.

Signed and Sealed this

Fifteenth Day of April, 1997

Attest:

BRUCE LEHMAN

Attesting Officer

Commissioner of Patents and Trademarks